(12) United States Patent
Martin et al.

(10) Patent No.: US 10,803,356 B2
(45) Date of Patent: Oct. 13, 2020

(54) METHOD FOR UNDERSTANDING MACHINE-LEARNING DECISIONS BASED ON CAMERA DATA

(71) Applicant: HRL Laboratories, LLC, Malibu, CA (US)

(72) Inventors: Charles E. Martin, Thousand Oaks, CA (US); Soheil Kolouri, Calabasas, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 90 days.

(21) Appl. No.: 15/946,480

(22) Filed: Apr. 5, 2018

(65) Prior Publication Data
US 2018/0293464 A1 Oct. 11, 2018

Related U.S. Application Data

(60) Provisional application No. 62/482,938, filed on Apr. 7, 2017.

(51) Int. Cl.
*G06K 9/62* (2006.01)
*G06K 9/72* (2006.01)
(Continued)

(52) U.S. Cl.
CPC ......... *G06K 9/6259* (2013.01); *G06K 9/6218* (2013.01); *G06K 9/726* (2013.01);
(Continued)

(58) Field of Classification Search
CPC .... G06K 9/6259; G06K 9/6218; G06K 9/726; G06K 9/6262; G06K 9/6282;
(Continued)

(56) References Cited

U.S. PATENT DOCUMENTS 8,713,021 B2 4/2014 Bellegarda
9,235,752 B2 1/2016 Eaton et al.
(Continued)

FOREIGN PATENT DOCUMENTS

KR 10-2016-0130398 11/2016
WO WO 2014-204970 12/2014

OTHER PUBLICATIONS

"Ulges et al., Learning Visual Context for Image Annotation From Flickr Groups," Apr. 2011, IEEE, vol. 13, pp. 330-341 (Year: 2011).*

(Continued)

*Primary Examiner* — John W Lee
(74) *Attorney, Agent, or Firm* — Tope-McKay & Associates (57) ABSTRACT

Described is a system for understanding machine-learning decisions. In an unsupervised learning phase, the system extracts, from input data, concepts represented by a machine-learning (ML) model in an unsupervised manner by clustering patterns of activity of latent variables of the concepts, where the latent variables are hidden variables of the ML model. The extracted concepts are organized into a concept network by learning functional semantics among the extracted concepts. In an operational phase, a subnetwork of the concept network is generated. Nodes of the subnetwork are displayed as a set of visual images that are annotated by weights and labels, and the ML model per the weights and labels.

17 Claims, 10 Drawing Sheets

(51) Int. Cl.
G06N 20/00 (2019.01)
G06N 3/04 (2006.01)
G06N 3/08 (2006.01)
G06N 5/04 (2006.01)

(52) U.S. Cl.
CPC .............. *G06N 3/0454* (2013.01); *G06N 3/08* (2013.01); *G06N 5/045* (2013.01); *G06N 20/00* (2019.01); *G06K 9/6262* (2013.01); *G06K 9/6282* (2013.01)

(58) Field of Classification Search
CPC ........ G06N 3/0454; G06N 5/045; G06N 3/08; G06N 20/00
See application file for complete search history.

(56) References Cited

U.S. PATENT DOCUMENTS

| 10,176,435 B1* | 1/2019 | Sarkar | G06N 20/00 |
|---|---|---|---|
| 2009/0204555 A1 | 8/2009 | Vashist et al. | |
| 2015/0213361 A1* | 7/2015 | Gamon | G06N 20/00 706/12 |

OTHER PUBLICATIONS

L. Bazzani, A. Bergamo, D. Anguelov, and L. Torresani. Self-taught object localization with deep networks. In 2016 Institute of Electrical and Electronics Engineers (IEEE) Winter Conference on Applications of Computer Vision (WACV) pp. 1-9. IEEE, 2016.

A. Dosovitskiy, J. Tobias Springenberg, and T. Brox. Learning to generate chairs with convolutional neural networks. In Proceedings of the IEEE Conference on Computer Vision and Pattern Recognition, pp. 1538-1546, 2015.

A. Mahendran and A. Vedaldi. Understanding deep image representations by inverting them. In 2015 IEEE conference on computer vision and pattern recognition (CVPR), pp. 5188-5196. IEEE, 2015.

Simonyan, K., & Zisserman, A. Very Deep Convolutional Networks for Large-Scale Image Recognition. International Conference on Learning Representations, pp. 1-14, 2015.

M. D. Zeiler and R. Fergus. Visualizing and understanding convolutional networks. In European Conference on Computer Vision, pp. 818-833. Springer, 2014.

Zhou, B., Khosla, A., Lapedriza, A., Oliva, A., & Torralba, A. Object Detectors Emerge in Deep Scene CNNs. International Conference on Learning Representations, 2015, pp. 1-12.

B. Zhou, A. Khosla, A. Lapedriza, A. Oliva, and A. Torralba. Learning deep features for discriminative localization. In The IEEE Conference on Computer Vision and Pattern Recognition (CVPR), 2016, pp. 2921-2929.

Soheil Kolouri, Charles E Martin, and Heiko Hoffmann. Conference on Computer Vision and Pattern Recognition, Explainable Computer Vision Workshop, 2017, pp. 1670-1678.

Lee, C.Y., Gallagher, P.W. and Tu, Z. Generalizing Pooling Functions in Convolutional Neural Networks: Mixed, Gated, and Tree. In Artificial Intelligence and Statistics, pp. 464-472, 2016.

Notification of Transmittal of International Search Report and the Written Opinion of the International Searching Authority for PCT/US2018/026311; dated Jul. 26, 2018.

International Search Report of the International Searching Authority for PCT/US2018/026311; dated Jul. 26, 2018.

Written Opinion of the International Searching Authority for PCT/US2018/026311; dated Jul. 26, 2018.

Notification of International Preliminary Report on Patentability Chapter I for PCT/US2018/026311; dated Oct. 17, 2019.

International Preliminary Report on Patentability Chapter I for PCT/US2018/026311; dated Oct. 17, 2019.

* cited by examiner

METHOD FOR UNDERSTANDING MACHINE-LEARNING DECISIONS BASED ON CAMERA DATA

CROSS-REFERENCE TO RELATED APPLICATIONS

This is a Non-Provisional patent application of U.S. Provisional Application No. 62/482,938, filed in the United States on Apr. 7, 2017, entitled, "Method for Understanding Machine-Learning Decisions Based on Camera Data," the entirety of which is hereby incorporated by reference.

BACKGROUND OF INVENTION

(1) Field of Invention

The present invention relates to a system for understanding machine-learning decisions and, more particularly, to a system for understanding machine-learning decisions using clustering of the hidden activation of a complex machine-learning method.

(2) Description of Related Art

Multiple works have recently focused on understanding the internal representation of trained convolutional neural networks (CNNs). Zhou et al. (see the List of Incorporated Literature References, Literature Reference No. 6) studied the activation patterns of a CNN trained for scene classification and showed that various object detectors emerge from the activation patterns. In other words, the activation patterns in the CNN encode various objects and can be used to detect them, even though the network was not specifically trained for an object detection task.

Dosovitskiy, Springenberg, and Brox (see Literature Reference No. 2) and Mahendran and Vedaldi (see Literature Reference No. 3) proposed methods for inverting CNN feature representations to obtain images which contain the information preserved by the network. Similarly, Zeiler and Fergus (see Literature Reference No. 5) introduced a method to visualize what activates each hidden unit in a CNN. Moreover, generative networks have also attracted much attention recently as they could be used to visualize and understand convolutional networks.

Another set of approaches alter the input images (by for instance blocking a small portion of the image) and study the differences between corresponding CNN outputs to decode semantic value of the alternation. For example, Bazzan et al. (see Literature Reference No. 1) use a pre-trained CNN and mask out parts of the input image and analyze the recognition score (i.e., network response). In this manner, they are able to localize the object in the input image. Alternatively, Zhou et al. (see Literature Reference No. 7) used global average pooling to model convolutional activation patterns and localized objects recognized by the network in this manner.

This prior art described above primarily focuses on visualizing parts of the input data that correspond to specific activations in the network, or trying to invert the network and generate images from extracted features. Additionally, the prior art essentially shows that meaningful intermediate and image-component-level information is present in the hidden layers of a CNN, but it does not address clustering nor provide an unsupervised way to achieve such clustering. Teasing apart such clusters is essential for building a concept network behind a decision pathway.

Thus, a continuing need exists for a method for clustering of hidden activations of a complex machine-learning (ML) method and that considers the functional interactions among concepts within an ML model to capture relationships, such as context.

SUMMARY OF INVENTION

The present invention relates to a system for understanding machine-learning decisions and, more particularly, to a system for understanding machine-learning decisions using clustering of the hidden activation of a complex machine-learning method. The system comprises one or more processors and a non-transitory computer-readable medium having executable instructions encoded thereon such that when executed, the one or more processors perform multiple operations. In an unsupervised learning phase, the system extracts from input data a plurality of concepts represented by an ML model in an unsupervised manner by clustering patterns of activity of latent variables of the concepts, wherein the latent variables are hidden variables of the ML model. The extracted concepts are organized into a concept network by learning functional semantics among the extracted concepts. In an operational phase, the system generates a subnetwork of the concept network. Nodes of the subnetwork are displayed as a set of visual images that are annotated by weights and labels, and the ML model is refined per the weights and labels.

In another aspect, the subnetwork is rendered and displayed as a visual depiction of a set of decision pathways leading up to a decision output made by the ML model.

In another aspect, in the operational phase, the system renders and displays the subnetwork as a visual depiction of a set of decision pathways leading up to a decision output made by the ML model.

In another aspect, the system automatically modifies the ML model to improve correctness of the decision output based on the subnetwork, resulting in a modified ML model.

In another aspect, a physical system is controlled based on an output of an unmodified ML model or the modified ML model.

In another aspect, in the unsupervised learning phase, the system collects a plurality of subsets of latent variable activations from the input data processed with the ML model, resulting in activation vectors. The activation vectors are clustered in an unsupervised manner, resulting in a set of clusters. Functional semantics are computed for each cluster, wherein the functional semantics form the concept network. The concept network captures the plurality of concepts represented by the ML model with respect to the input data, and the concept network is learned.

In another aspect, in the operational phase, the system processes a single data input by the ML model that activates its latent variables and generates a model decision. The activation vectors are associated with nodes in the concept network, creating the subnetwork of the concept network.

In another aspect, each subset of a plurality of subsets of latent variable activations is generated by distinct input data.

In another aspect, the functional semantics represent an extent to which the plurality of concepts influence one another within the ML model via a set of weighted directed edges in the concept network.

In another aspect, the system causes a vehicle to perform a vehicle operation based on a decision output by the ML model.

In another aspect, the device is a machine used in manufacturing.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for understanding machine-learning decisions and, more particularly, to a system for understanding machine-learning decisions using clustering of the hidden activation of a complex machine-learning method. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. L. Bazzani, A. Bergamo, D. Anguelov, and L. Torresani. Self-taught object localization with deep networks. In 2016 Institute of Electrical and Electronics Engineers (IEEE) Winter Conference on Applications of Computer Vision (WACV), pages 1-9. IEEE, 2016.
2. A. Dosovitskiy, J. Tobias Springenberg, and T. Brox. Learning to generate chairs with convolutional neural networks. In Proceedings of the IEEE Conference on Computer Vision and Pattern Recognition, pages 1538-1546, 2015.
3. A. Mahendran and A. Vedaldi. Understanding deep image representations by inverting them. In 2015 IEEE conference on computer vision and pattern recognition (CVPR), pages 5188-5196. IEEE, 2015.
4. Simonyan, K., & Zisserman, A. Very Deep Convolutional Networks for Large-Scale Image Recognition. International Conference on Learning Representations, 1-14, 2015.
5. M. D. Zeiler and R. Fergus. Visualizing and understanding convolutional networks. In European Conference on Computer Vision, pages 818-833. Springer, 2014.

6. Zhou, B., Khosla, A., Lapedriza, A., Oliva, A., & Torralba, A. Object Detectors Emerge in Deep Scene CNNs. International Conference on Learning Representations, 2015.
7. B. Zhou, A. Khosla, A. Lapedriza, A. Oliva, and A. Torralba. Learning deep features for discriminative localization. In The IEEE Conference on Computer Vision and Pattern Recognition (CVPR), 2016.
8. Soheil Kolouri, Charles E Martin, and Heiko Hoffmann. Conference on Computer Vision and Pattern Recognition, Explainable Computer Vision Workshop, 2017.
9. Lee, C. Y., Gallagher, P. W. and Tu, Z. Generalizing Pooling Functions in Convolutional Neural Networks: Mixed, Gated, and Tree. In Artificial Intelligence and Statistics, pages 464-472, 2016.

(2) Principal Aspects

Various embodiments of the invention include three "principal" aspects. The first is a system for understanding machine-learning decisions. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
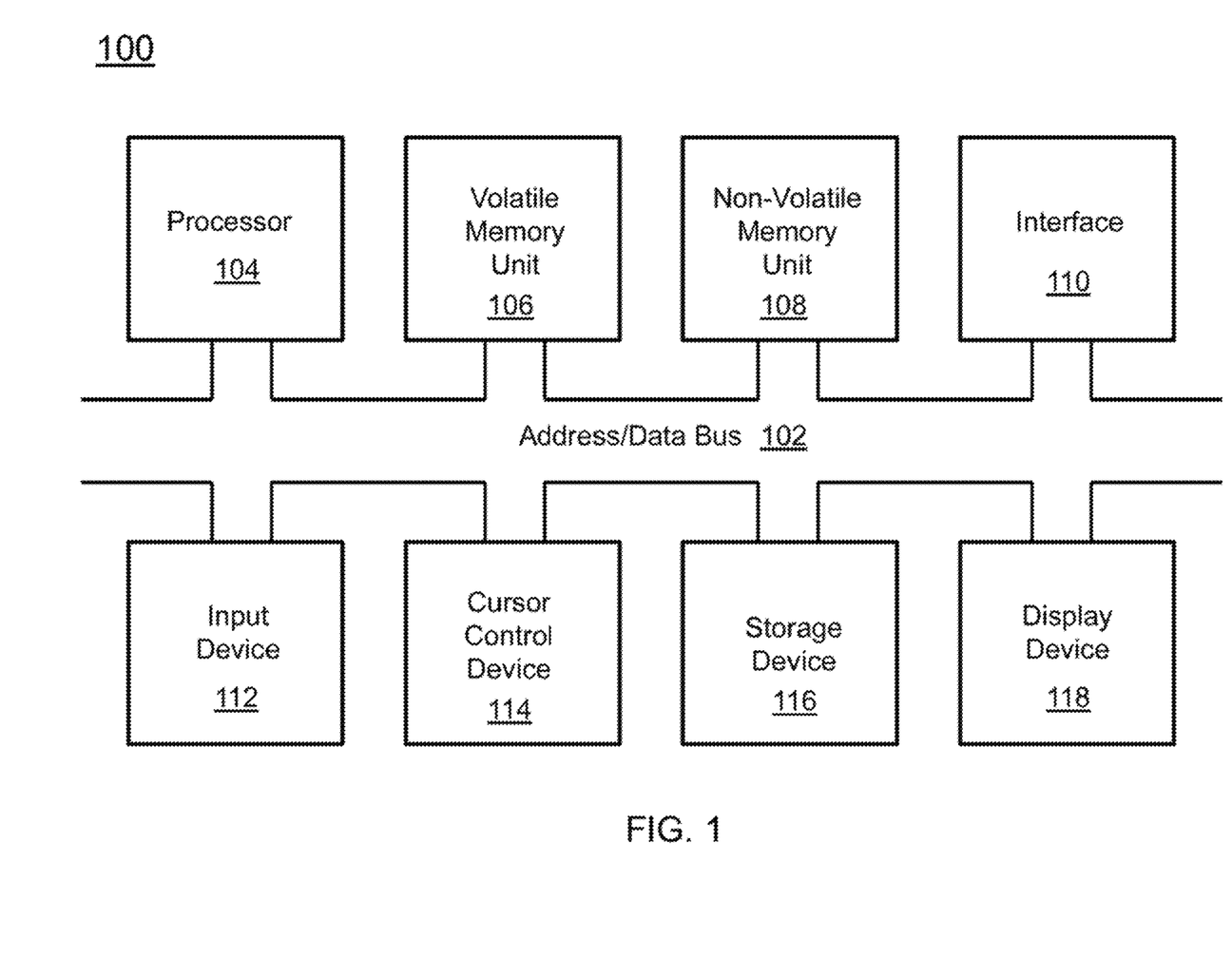
FIG. 1 is a block diagram depicting the components of a system for understanding machine-learning decisions according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment.

Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
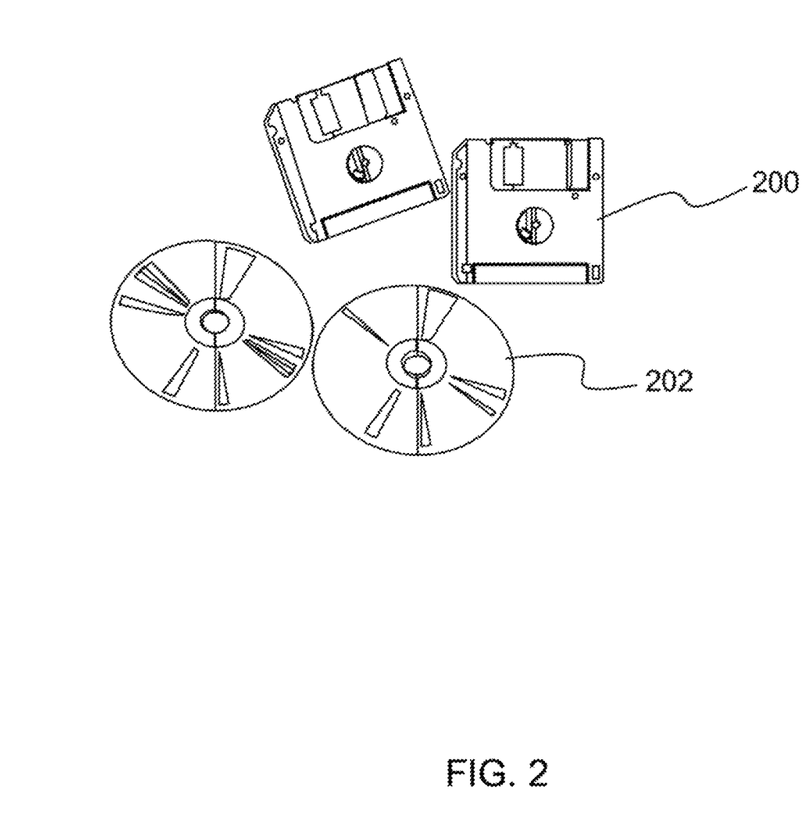
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a method to help a user understand the decisions of a complex machine learning (ML) system given camera input data. A non-limiting example of a complex machine learning system is a convolutional neural network. A non-limiting example of a decision is an image classification (e.g., the image shows a "bicycle"). The heart of the invention is a two-step process. The first step identifies the concepts represented by the complex ML models in an unsupervised manner by clustering the patterns of activity in their hidden variables. The second step organizes the extracted concepts into a concept network by learning the functional semantics among the concepts. Functional semantics capture the way in which concepts interact with one another (e.g., cars are expected in an intersection). The functional semantics are captured by the weighted edges in the concept network.

The invention described herein improves the trust in machine learning systems. Today, many applications (e.g., military) prohibit the use of ML systems because they make decisions that cannot be reproduced or comprehended. By providing insights into the decision process, ML systems can be better targeted to specific applications, and their decisions can be further improved, which increases justifiable trust in their operation from the user's perspective. One advantage of the system according to embodiments of the present disclosure is that it learns, in an unsupervised manner, a simplified structure behind a decision process (in contrast to the millions of parameters in a typical deep learning system) and allows intuitive visualization of this process. The invention described herein can automatically modify the ML model to improve correctness of the decision output based on the subnetwork. The concept subnetworks are readily identified by the system according to embodiments of the present disclosure, and these subnetworks are the ones that are needed to be modified. To correct wrong decisions of the entire network, the concept networks that heavily affect the wrong decision are identified based on the norm of the gradient of the network with respect to the concept subnetworks, and are updated accordingly.

Unsupervised clustering of the hidden activations of a complex machine learning method (e.g., convolutional neural networks) has not been done before. A method for such clustering is not obvious, since the parameter space of such activations is high-dimensional and the training data large, so suitable tricks have to be developed to find a computationally feasible solution. In addition, despite the fact that the problem of trust in the decision of neural networks has been around for more than twenty years, the invention described herein is the first to provide a visual depiction of the decision pathways leading up to a decision (e.g., an image classification), thereby validating and improving upon machine learning technologies.

(3.1) System and Methods

Figure 3:
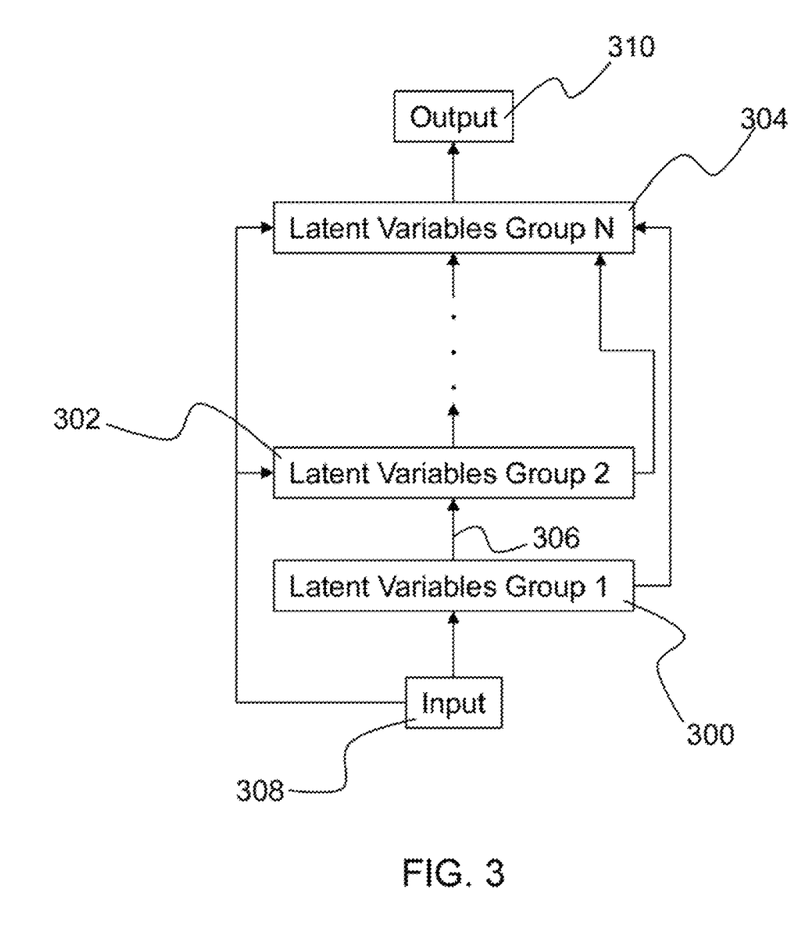
FIG. 3 is an illustration of a class of machine-learning (ML) models that can be explained by the system according to some embodiments of the present disclosure.

It is assumed that the machine learning (ML) model disclosed herein takes the form shown FIG. 3. The model consists of distinct groups of interacting latent variables (latent variables group 1 (300), latent variables group 2 (302), and latent variables group 3 (304)). The latent variables 300, 302, and 304 take on numeric values. Interaction between the latent variables 300, 302, and 304 is indicated by the presence of an arrow (e.g., arrow 306). The model is feedforward in that each group of latent variables 300, 302, or 304 influences only subsequent groups of latent variables (i.e., there are no computational loops in the model). FIG. 3 shows only a subset of possible connections. The latent variables 300, 302, and 304 are activated by passing an input 308 to the model. In one embodiment, the input 308 is from a camera device. The image modality may also be infrared or magnetic resonance imaging. The output 310 is a subnetwork of the full concept network. The latent variable activation vectors are associated with their corresponding nodes in the concept network, which creates a subnetwork of the full concept network (element 310), as will be described in detail below.

Figure 4:
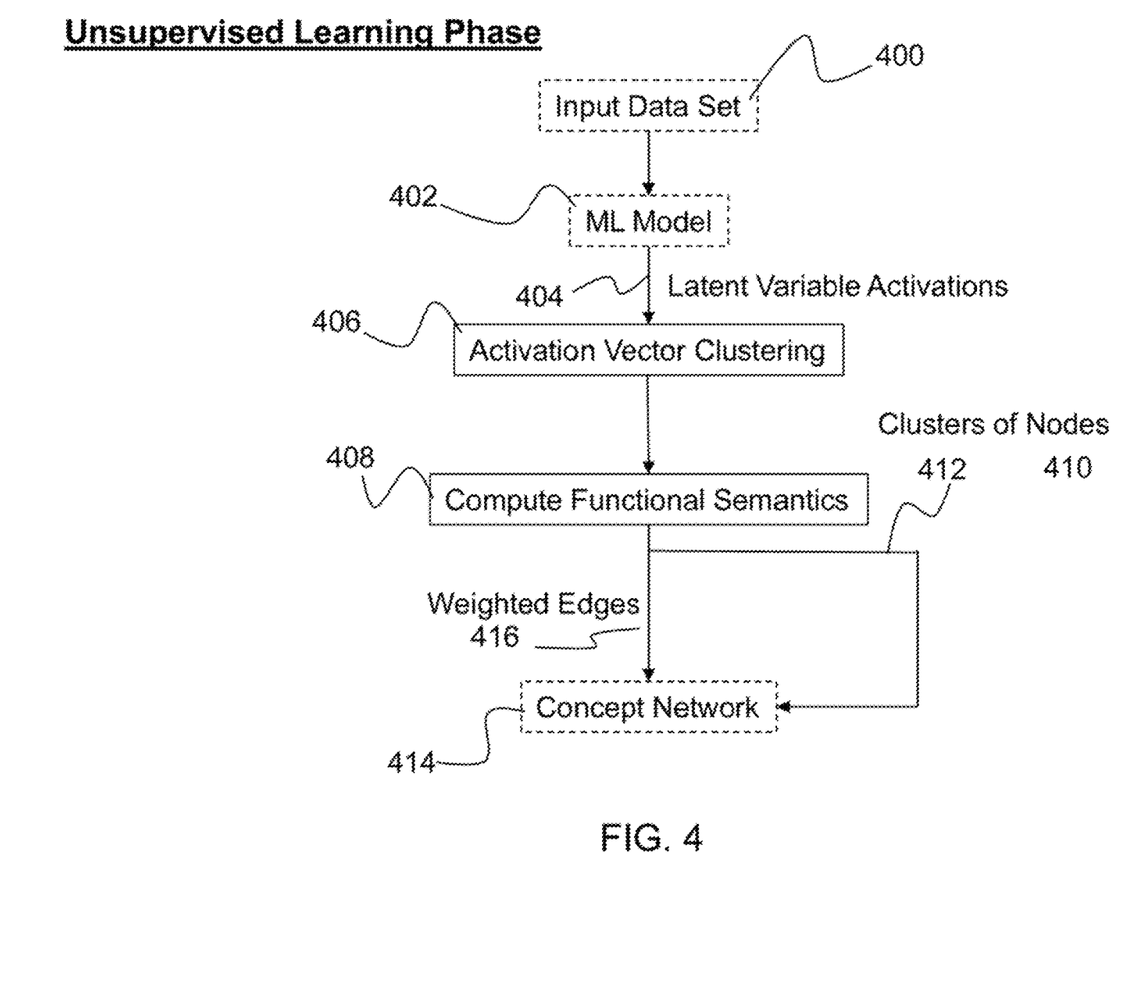
FIG. 4 is an illustration of an unsupervised learning phase of the system according to some embodiments of the present disclosure.
Figure 5:
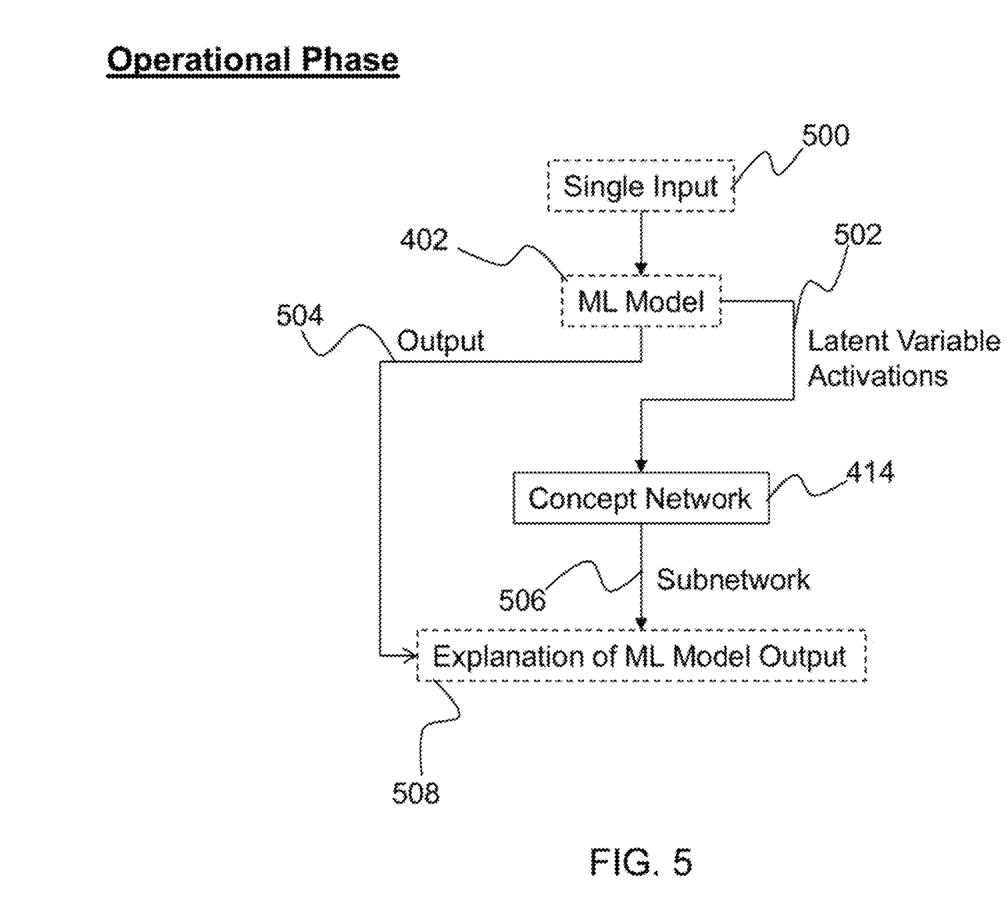
FIG. 5 is an illustration of an operational phase of the system according to some embodiments of the present disclosure.

A systematic representation of the system described herein is shown in FIGS. 4 and 5. The system comprises a sequence of two phases: an unsupervised learning phase and an operational phase. FIG. 4 depicts the unsupervised learning phase. First, an input data set 400 is fed through the ML model 402, and the resulting latent variable activations 404 are collected. The set takes the form S={{$G_{11}$, $G_{21}$, ... }, {$G_{12}$, $G_{22}$, ... }, ... }. Each subset of S is generated by a distinct input to the ML model and contains the resulting latent variable activation vectors collected by the group. For example, G21 contains the activation vectors in group 2 generated by input 1.

Next, the activation vectors within each group are clustered (i.e., activation vector clustering 406), and the functional semantics are computed 408, which form the nodes 410 and edges of the concept network. An example of a clustering method for latent variables is described in Literature Ref 8. Each cluster 412 is associated with a node 410 in the concept network 414, which is the output of the invention described herein. The clusters 412 are used to determine the edges in the concept network 414. The edges are computed by the functional semantics module (i.e., compute functional semantics 408), and these edges (i.e., weighted edges 416) indicate how the activation vector representations of different concepts interact with one another (see section (3.3)). For the sake of simplicity, while reference is made to the concepts as interacting, it is actually their activation vector representations within the ML model 402 that interact. The output of this phase of the system is a concept network 414 that captures the "concepts" (described below) represented by the ML model 402 with respect to the input data set 400. Dashed boxes represent input and output components of the invented method.

Once the concept network 414 has been learned, the invention according to embodiments of this disclosure can be used in the operational phase to explain ML model 402 decisions. A diagram of this phase is shown in FIG. 5. At this stage, the ML model 402 receives a single input 500 that activates its latent variables (i.e., latent variable activation 502) and generates a model output/decision 504. The latent variable activation vectors are associated with their corresponding nodes in the concept network 414, which creates a subnetwork 506 of the full concept network. The subnetwork 506 along with the ML model output 504 can be used by the end user to understand why the ML model 402 made the decision (i.e., explanation of ML model output 508). An example of this process is described in section (3.6).

(3.2) Activation Vector Clustering (Element 406)

The first step in the method described herein is to cluster the latent variable activation vectors across all model inputs (all subsets of S), where the number of model inputs is denoted as |S|. A particular clustering is not prescribed, because that choice is dependent on the type of ML model. However, in section (3.6) below, it is described that Sparse Subspace Clustering works well for convolutional neural networks. Furthermore, a general approach for grouping the latent variables into vectors is not specified, because this depends on the ML model architecture. Various pooling schemes, including the hierarchical average pooling and max pooling (see Literature Reference No. 9), could be used to group the latent variables into a vector on different ML models. However, it is disclosed in section (3.6) that treating the columns of a convolutional layer in a convolutional neural network as the vectors works well. The activation vectors belonging to each group i are clustered separately. That is, for each i, cluster the set of activation vectors $U_j G_{ij}$. Thus, for $N_g$ groups there are $N_g$ sets of clustered vectors. Denote the set of clustered activation vectors as $S_a$, where $|S_a|=N_g$. Each element of $S_g \in S_a$ contains one or more clusters of activation vectors $S_c \in S_g$. Denote the centroid of a cluster as c=centroid ($S_c$). Cluster centroids are vectors that are near latent variable activation vectors that tend to represent particular salient patterns in the model input. These salient patterns are called concepts (see section (3.6) for examples of concepts in the image domain). The output of this step in the invention is the set of cluster centroids V, which will form the vertices in the concept network that is an output of the invention.

(3.3) Functional Semantics (Element 408)

The next step in the method described herein computes the functional semantics (408) between the cluster centroids in V. The functional semantics (408) represent the extent to which the concepts influence one another within the model. The functional semantics (408) are represented by a set of weighted, directed edges $E_f$ (416) in the concept network (414). Functional semantics (408) between a pair of concepts is determined by considering the expected first order derivative between their activity-based representations in the ML model. Let $\vec{x} \in \mathbb{R}^n$ and $\vec{y} \in \mathbb{R}^m$ be latent variable activation vectors corresponding to concepts of type $c_x$ and $c_y$, respectively. For example, $c_x$ and $c_y$ could be the closest cluster centroids. Then, the weight on the functional semantic edge from $c_x$ to $c_y$ in the concept graph is given by:

$$w_{c_x,c_y} = E\left[\text{sum}\left(\frac{d\vec{y}}{d\vec{x}}\right)\right], \text{ where } \frac{d\vec{y}}{d\vec{x}}$$

is the Jacobian matrix, and the expected value E is taken over all model inputs for which the concepts $c_x$ and $c_y$ co-occur.

(3.4) Concept Network (Element 414)

The output of the unsupervised learning phase is a concept network (414), which provides a succinct representation of a complex ML model (402). The system according to embodiments of the present disclosure organizes the extracted concepts into a concept network (414) by learning the functional semantics (408) among the concepts in an unsupervised manner. The concepts define the nodes in the network, while the functional semantics define the edges.

Figure 6:
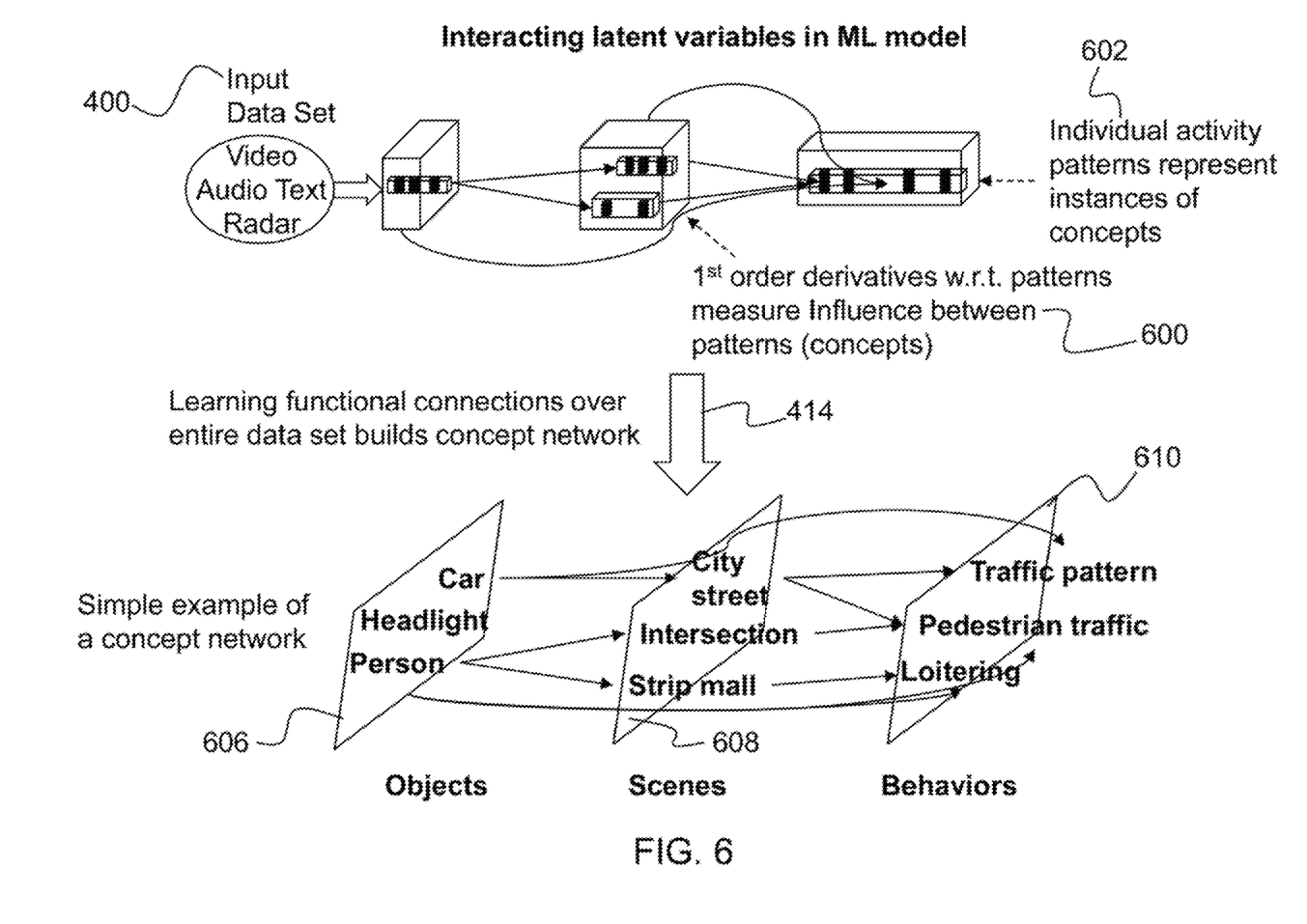
FIG. 6 is an illustration of learning a concept network from the patterns of activity in latent variables of an ML model according to some embodiments of the present disclosure.

FIG. 6 illustrates how the system according to embodiments of the present disclosure learns a concept network from the patterns of activity in the latent variables of an ML model. The learned concept network contains concepts (nodes) and relationships (edges) that are represented by the ML model. From an input data set 400 (from video, audio, text or radar), the ML model is generated. As described above, first order derivatives with respect to patterns measure influence between patterns (concepts) (element 600). Individual activity patterns represent instances of concepts (element 602). Further, FIG. 6 depicts how the functional semantics capture relationships among concepts present in the input data set 400. Learning functional connections over the entire data set builds the concept network (element 414). In this example, the system described herein has mapped latent variable activation patterns within the ML model to various urban concepts, such as car or person (objects 606), city street (scenes 608), and loitering (behaviors 610). The functional connections from car (objects 606) to traffic pattern (behavior 610) and from person (object 606) to loitering (behavior 610) are indicative of the fact that cars and people are key objects 606 involved in traffic patterns and loitering (behavior 610), respectively. The functional connections from car (object 606) to city street (scene 608) and from city street (scene 608) to traffic pattern and pedestrian traffic (behaviors 610) capture how these interrelated concepts interact with one another when represented as patterns of activity in the ML model's latent variables.

(3.5) Concept Subnetworks

Once the concept network has been learned, the system can be used to generate concept subnetworks during the operational phase. A concept subnetwork is a compact and expressive representation of the concepts and inter-concept relationships present in an input to a machine learning (ML) model. Subnetworks help explain ML model decisions by allowing identification of a common structure among subnetworks that is indicative of why an ML model makes specific decisions, recommendations, or takes particular actions. Comparison between subnetworks can be accomplished by using the rich set of tools available for graph/network analytics, such as distance measures between graphs and subgraph matching. The relationships between subnetworks explain the decisions of the ML model by isolating the concepts and relationships that drove the decisions.

Figure 7:
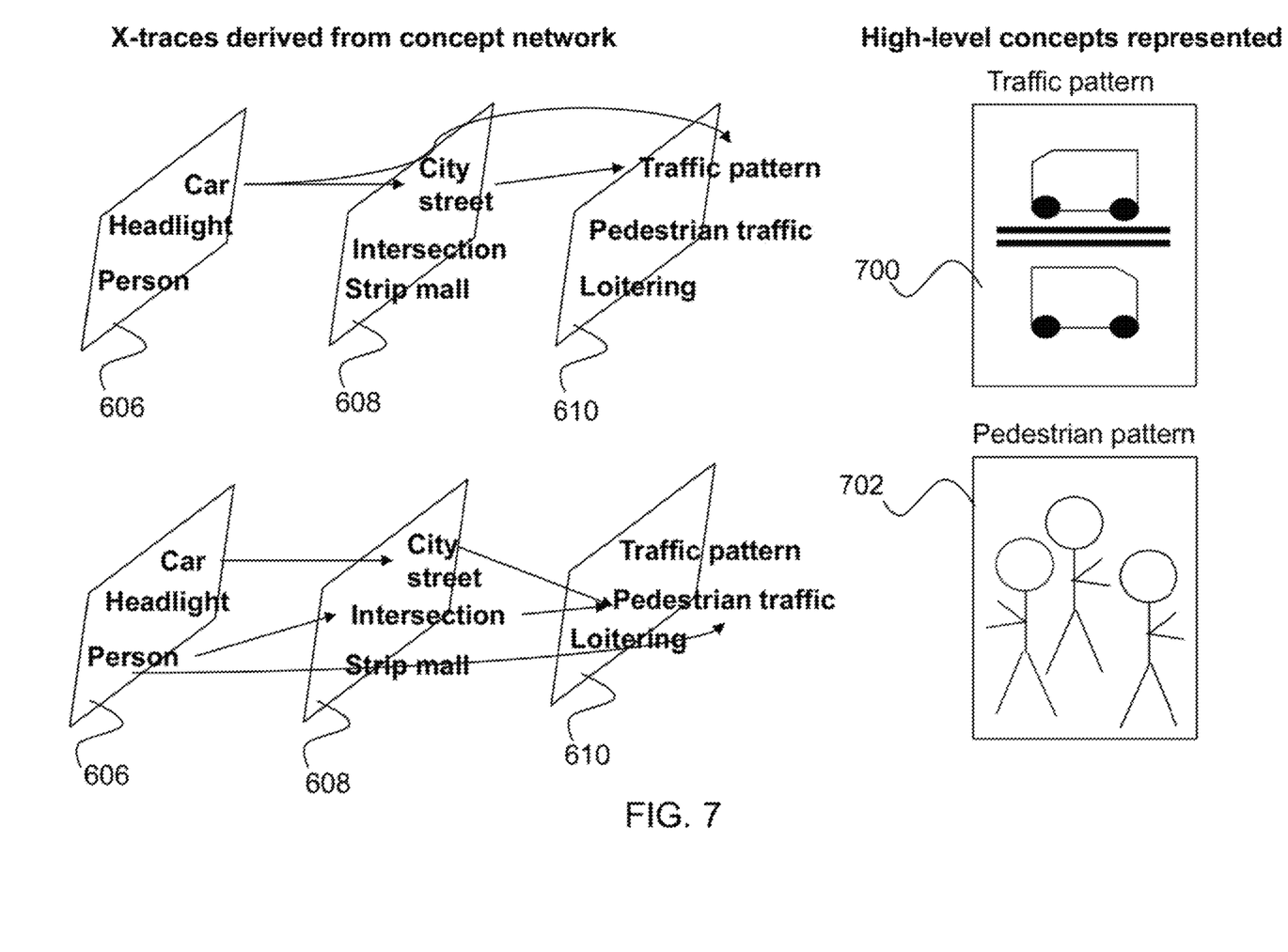
FIG. 7 is an illustration of examples of concept subnetworks according to some embodiments of the present disclosure.

Subnetworks are directed acyclic graphs that are derived from the concept network. When an ML model receives an input, the resulting latent variable activation vectors are associated with different concepts (nodes), and these concepts are related to one another through their functional semantics (edges), all of which are derived during the unsupervised learning phase of our invention. FIG. 7 illustrates non-limiting examples of two subnetworks that capture the concepts and functional semantics that a ML model might use to represent the complex concepts "traffic pattern" (element 700) and "pedestrian traffic" (element 702).

(3.6) Experimental Studies

Figure 8A:
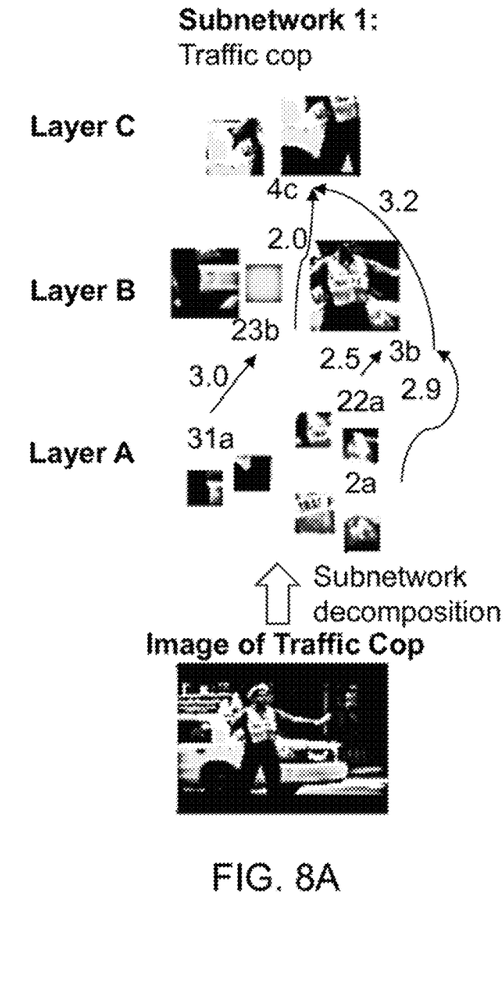
FIG. 8A is an illustration of a traffic cop subnetwork according to some embodiments of the present disclosure.
Figure 8B:
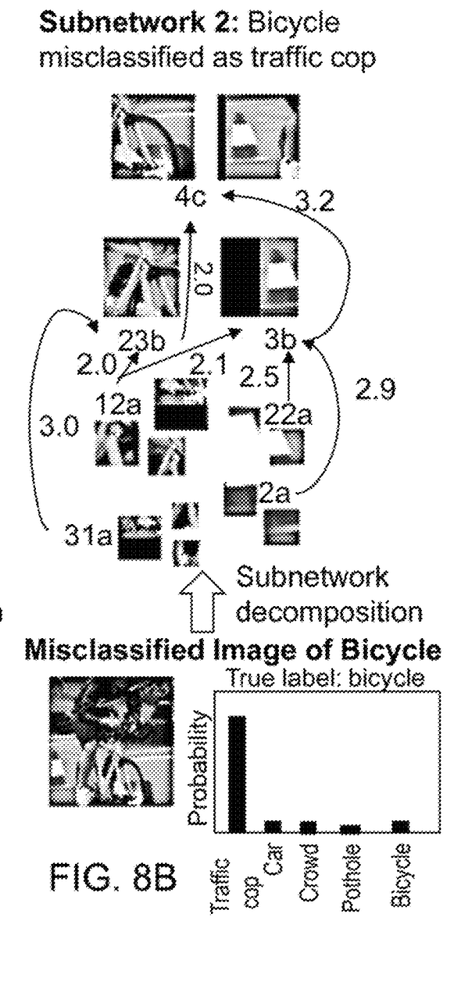
FIG. 8B is an illustration of a subnetwork with a bicycle misclassified as a traffic cop according to some embodiments of the present disclosure.
Figure 8C:
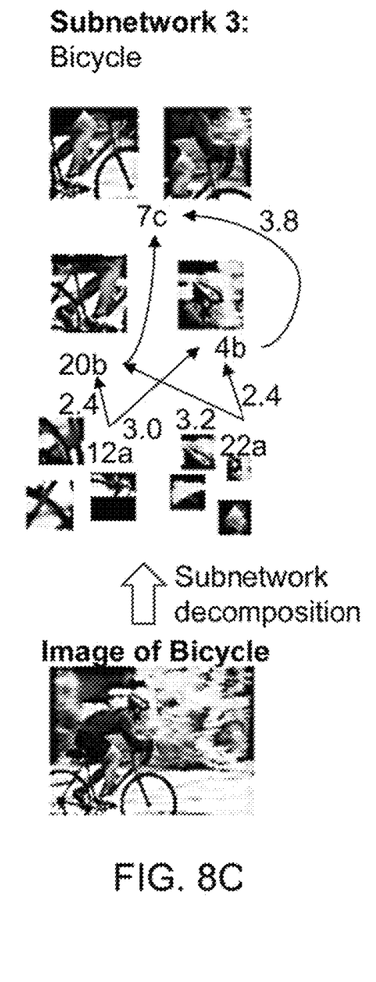
FIG. 8C is an illustration of a bicycle subnetwork according to some embodiments of the present disclosure.

A study was performed to illustrate the effectiveness of using the system according to embodiments of the present disclosure to explain ML model decisions. In this study, a state-of-the-art convolutional neural network (see Literature Reference No. 4) was trained to classify objects relevant to roadway scenes, such as traffic cops, bicycles, cars, and construction. The activation vectors were clustered using Sparse Subspace Clustering. FIGS. 8A-8C show portions of concept subnetworks generated by three different images. The concepts are denoted by arbitrary alpha-numeric labels (e.g., 31a, 23b, and 7c). For each concept in each subnetwork, some representative image patches are shown. The weighted connections between concepts denote the functional semantics (section (3.3)). These subnetworks came from a concept network with three layers called A, B, and C. Subnetwork 1 in FIG. 8A comes from an image that was correctly classified as traffic cop by the ML model. Subnetwork 2 in FIG. 8B comes from an image of a bicycle that was incorrectly classified as traffic cop. This is the ML model decision that needs explaining. Subnetwork 3 in FIG. 8C comes from an image that was correctly classified as bicycle. Comparing these subnetworks, the structure that is similar between subnetwork 2 and subnetwork 1 is identified from correctly classified images of traffic cops (why traffic cop?) and structure that is dissimilar between subnetwork 2 and subnetwork 3 from correctly classified images of bicycles (e.g., why not bicycle?).

The reason for the incorrect classification is clear. In FIG. 8B, the subnetwork shows that the ML model focused on the bright orange color and high contrast stripe on the traffic cone and the yellow color of the bicycle frame, which match with the brightly colored, striped vests worn by traffic cops and the ubiquitous yellow color of taxis in urban areas. The model largely ignored the rider and did not focus on distinct bicycle components. This is in contrast to subnetwork 3 (FIG. 8C), where the bicycle frame and components and the rider are thoroughly represented by multiple views and at multiple scales.

Figure 9:
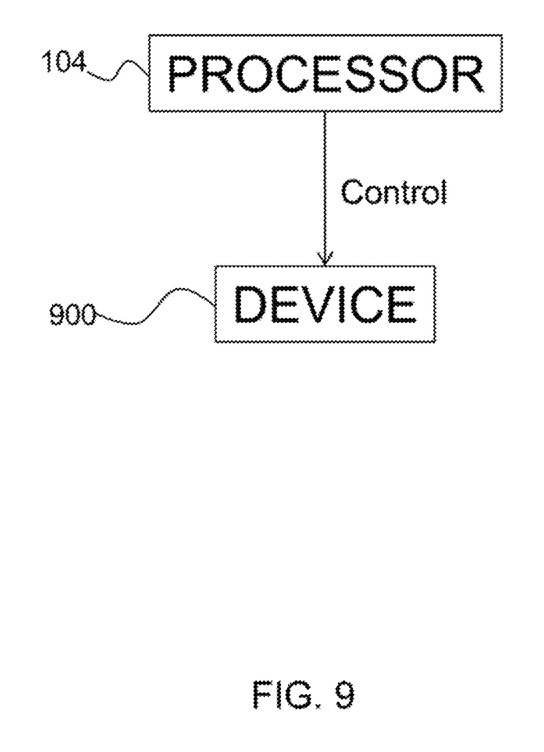
FIG. 9 is a flow diagram illustrating control of devices based on the subnetwork of the concept network according to some embodiments of the present disclosure.

FIG. 9 is a flow diagram illustrating using a processor 104 to control a device 900 based on a decision output by the ML model. Non-limiting examples of devices 900 that can be controlled via the processor 104 and the output decision include a vehicle or a vehicle component, such as a brake, a steering mechanism, suspension, or safety device (e.g., airbags, seatbelt tensioners, etc.) and a manufacturing machine. Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Figure 10:
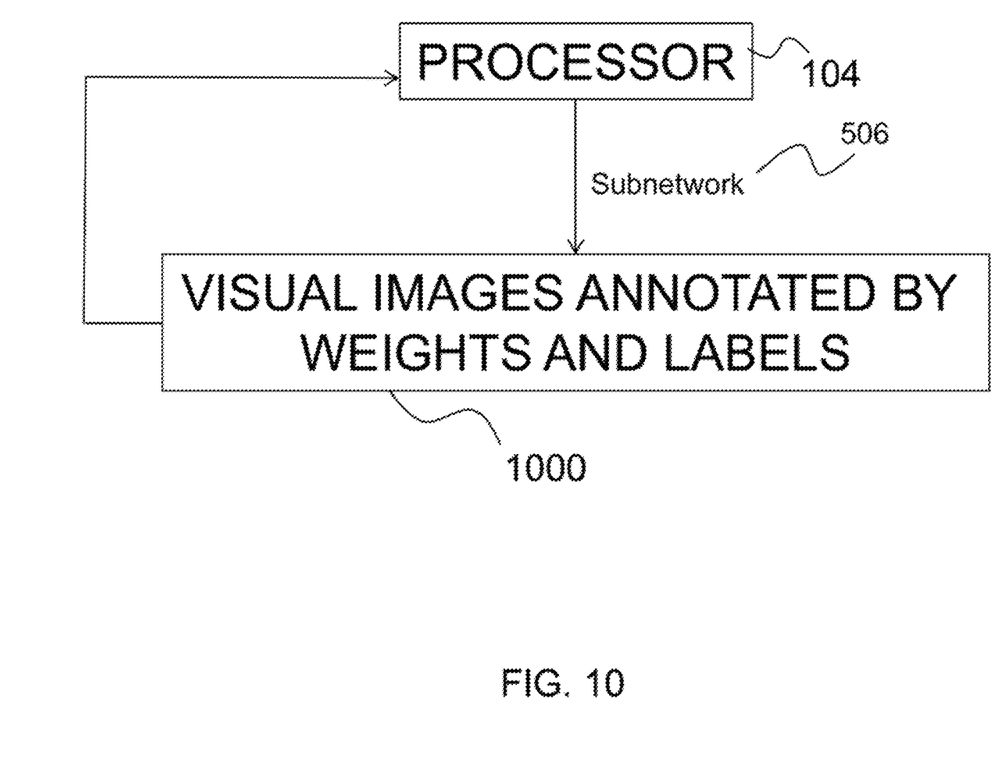
FIG. 10 is a flow diagram illustrating production of visual images annotated by weights and labels according to some embodiments of the present disclosure.

In general, given an input image, the invention described herein displays the salient image patches associated with each node of a context subnetwork along with the label of each node and the weights on the network edges. As shown in FIG. 10, a processor 104 generates the subnetwork 506, which is used to produce visual images annotated by weights and labels 1000. The nodes of the subnetwork are displayed as a set of visual images of the nodes that are annotated by weights and labels, which can be used to refine the ML model. In other words, the subnetwork 506, consisting of images annotated by weights and labels 1000, can be fed back to the machine-learning system (processor 104) in order to improve the accuracy of object identification. A person can use the displayed subnetwork to determine why a machine learning model has made a particular decision and whether or not to trust the model in the future. For example, using the displayed subnetworks, a user may determine that a model has learned a strong correlation between traffic cones and traffic cops, and will, thus, be prone to misclassifying any image with a traffic cone as a traffic cop.

Trustworthy machine learning systems are a key requirement for autonomous driving. Particularly, the processing of camera data is considered to be essential in any autonomous driving system. A non-limiting example of decision making in autonomous driving is the following, using image/scene classification. The system makes a decision whether it is safe to make a left turn (yes/no) using trajectory speed and heading (numeric values) of the vehicle and surrounding vehicles and road elements. If the decision is made that it is safe to make a left turn (or accelerate or stop, as other examples), then the autonomous vehicle proceeds with the vehicle operation. If the decision is that it is not safe to proceed with the vehicle operation, then the autonomous vehicle does not perform the vehicle operation.

In addition, the system can be used to control a machine, such as a manufacturing machine in an assembly line. For example, the system described herein can be used to detect and identify shapes and orientations of assembly spaces and parts accurately. Using the output decision of the ML model, a machine could be caused to select correct assembly parts and place them into the proper assembly spaces.

Moreover, trustworthy machine learning systems are of key interest for autonomous drones. In an autonomous drone, the decision pathway can be: obtaining yaw, pitch, and roll adjustments (numeric values), then determining whether a target of interest has been detected (yes/no). In addition, the invention is applicable to camera surveillance. An example of decision making in camera surveillance is the following. Is activity in a scene suspicious? (yes/no), then classifying an object in a scene (categorical).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for understanding machine-learning (ML) decisions, the system comprising:
    one or more processors and a non-transitory computer-readable medium having executable instructions encoded thereon such that when executed, the one or more processors perform operations of:
processing a set of input data with a convolutional neural network (CNN) model, resulting in a set of latent variable activation vectors within the CNN model, wherein each latent variable activation vector in the CNN model represents a concept in the set of input data;
clustering the set of latent variable activation vectors in an unsupervised manner, resulting in a plurality of clusters of latent variable activation vectors;
computing functional semantics for each cluster, wherein the functional semantics represent relationships among concepts in the set of input data;
generating a concept network comprising a plurality of nodes and a plurality of weighted directed edges, wherein the plurality of nodes are defined by concepts and the plurality of weighted directed edges are defined by the computed functional semantics;
in an operational phase, generating a subnetwork of the concept network; and
displaying nodes of the subnetwork as a set of visual images that are annotated by weights and labels; and refining the CNN model per the weights and labels.

2. The system as set forth in claim 1, wherein the one or more processors further perform an operation of in the operational phase, rendering and displaying the subnetwork as a visual depiction of a set of decision pathways leading up to a decision output made by the CNN model.

3. The system as set forth in claim 2, wherein the one or more processors further perform an operation of automatically modifying the CNN model to improve correctness of the decision output based on the subnetwork, resulting in a modified CNN model.

4. The system as set forth in claim 3, wherein the one or more processors further perform an operation of controlling a physical system based on an output of an unmodified CNN model or the modified CNN model.

5. The system as set forth in claim 1, wherein in the operational phase, the one or more processors further perform operations of:
processing a single data input by the CNN model that activates latent variables of the CNN model and generates a model decision; and
associating the latent variable activation vectors with nodes in the concept network, creating the subnetwork of the concept network.

6. The system as set forth in claim 1, wherein the functional semantics represent an extent to which concepts influence one another within the CNN model via the plurality of weighted directed edges in the concept network.

7. The system as set forth in claim 1, wherein the one or more processors further perform an operation of causing a vehicle to perform a vehicle operation based on a decision output by the CNN model.

8. The system as set forth in claim 1, wherein the device is a machine used in manufacturing.

9. A computer implemented method for understanding machine-learning (ML) decisions, the method comprising an act of:
causing one or more processors to execute instructions encoded on a non-transitory computer-readable medium, such that upon execution, the one or more processors perform operations of:
processing a set of input data with a convolutional neural network (CNN) model, resulting in a set of latent variable activation vectors within the CNN model, wherein each latent variable activation vector in the CNN model represents a concept in the set of input data;
clustering the set of latent variable activation vectors in an unsupervised manner, resulting in a plurality of clusters of latent variable activation vectors;
computing functional semantics for each cluster, wherein the functional semantics represent relationships among concepts in the set of input data;
generating a concept network comprising a plurality of nodes and a plurality of weighted directed edges, wherein the plurality of nodes are defined by concepts and the plurality of weighted directed edges are defined by the computed functional semantics;
in an operational phase, generating a subnetwork of the concept network;
displaying nodes of the subnetwork as a set of visual images that are annotated by weights and labels; and
refining the CNN model per the weights and labels.

10. The method as set forth in claim 9, wherein in the operational phase, the one or more processors further perform operations of:
processing a single data input by the CNN model that activates latent variables of the CNN model and generates a model decision; and
associating the latent variable activation vectors with nodes in the concept network, creating the subnetwork of the concept network.

11. The method as set forth in claim 9, wherein the functional semantics represent an extent to which concepts influence one another within the CNN model via the plurality of weighted directed edges in the concept network.

12. The method as set forth in claim 9, wherein the one or more processors perform an operation of causing a vehicle to perform a vehicle operation based on a decision output by the CNN model.

13. A computer program product for understanding machine-learning (ML) decisions, the computer program product comprising:
computer-readable instructions stored on a non-transitory computer-readable medium that are executable by a computer having one or more processors for causing the processor to perform operations of:
processing a set of input data with a convolutional neural network (CNN) model, resulting in a set of latent variable activation vectors within the CNN model, wherein each latent variable activation vector in the CNN model represents a concept in the set of input data;
clustering the set of latent variable activation vectors in an unsupervised manner, resulting in a plurality of clusters of latent variable activation vectors;
computing functional semantics for each cluster, wherein the functional semantics represent relationships among concepts in the set of input data;
generating a concept network comprising a plurality of nodes and a plurality of weighted directed edges, wherein the plurality of nodes are defined by concepts and the plurality of weighted directed edges are defined by the computed functional semantics;
in an operational phase, generating a subnetwork of the concept network;
displaying nodes of the subnetwork as a set of visual images that are annotated by weights and labels; and
refining the CNN model per the weights and labels.

14. The computer program product as set forth in claim 13, further comprising instructions for, in the operational phase, causing the one or more processors to further perform operations of:
   processing a single data input by the CNN model that activates latent variables of the CNN model and generates a model decision; and
   associating the latent variable activation vectors with nodes in the concept network, creating the subnetwork of the concept network.

15. The computer program product as set forth in claim 13, wherein the functional semantics represent an extent to which concepts influence one another within the CNN model via the plurality of weighted directed edges in the concept network.

16. The computer program product as set forth in claim 13, wherein the one or more processors perform an operation of causing an autonomous vehicle to perform a vehicle operation based on a decision output by the CNN model.

17. The system as set forth in claim 2, wherein the decision output is an image classification.

* * * * *